(12) United States Patent
Wei et al.

(10) Patent No.: US 11,075,575 B2
(45) Date of Patent: *Jul. 27, 2021

(54) RESONANT CONVERTER AND CONTROL METHOD OF THE RESONANT CONVERTER

(71) Applicant: DELTA ELECTRONICS, INC., Taoyuan (TW)

(72) Inventors: Tao Wei, Taoyuan (TW); Hao Lu, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/931,460

(22) Filed: Jul. 17, 2020

(65) Prior Publication Data

US 2020/0350815 A1    Nov. 5, 2020

Related U.S. Application Data

(63) Continuation of application No. 16/286,619, filed on Feb. 27, 2019, now Pat. No. 10,756,617.

(30) Foreign Application Priority Data

Jun. 20, 2018  (CN) .......................... 201810638360.2

(51) Int. Cl.
    H02M 1/08      (2006.01)
    H02M 3/335     (2006.01)
    H02M 1/00      (2006.01)

(52) U.S. Cl.
    CPC ....... *H02M 1/083* (2013.01); *H02M 3/33576* (2013.01); *H02M 2001/0009* (2013.01);
    (Continued)

(58) Field of Classification Search
    CPC .............................. H02M 1/08; H02M 1/083
    See application file for complete search history.

(56) References Cited

U.S. PATENT DOCUMENTS

| 2004/0136209 A1* | 7/2004 | Hosokawa | ........ H02M 3/33592 363/24 |
| 2009/0034299 A1* | 2/2009 | Lev | ................... H02M 3/33592 363/17 |

(Continued)

FOREIGN PATENT DOCUMENTS

| CN | 103959623 A | 7/2014 |
| CN | 106505869 A | 3/2017 |

OTHER PUBLICATIONS

Corresponding China Office Action dated May 7, 2020.
(Continued)

*Primary Examiner* — Alex Torres-Rivera
*Assistant Examiner* — David A. Singh
(74) *Attorney, Agent, or Firm* — CKC & Partners Co., LLC

(57) ABSTRACT

A resonant converter is disclosed, including: a primary side circuit including at least one set of primary side switches, where the primary side circuit is configured to receive an input voltage; a resonant network coupled to the primary side circuit; a transformer having a primary side winding and a secondary side winding, where the primary side winding is coupled to the resonant network; a secondary side circuit including at least one set of secondary side switches, where the secondary side circuit is coupled to the secondary side winding of the transformer; and a control block that controls the secondary side switches according to the input voltage, the output voltage and the current detection signal, so that the secondary side winding of the transformer is (Continued)

short-circuited during a preset time interval before operating state of the primary side switches changes.

20 Claims, 9 Drawing Sheets

(52) U.S. Cl.
CPC .............. *H02M 2001/0032* (2013.01); *H02M 2001/0058* (2013.01)

(56) References Cited

U.S. PATENT DOCUMENTS

| | | | | |
|---|---|---|---|---|
| 2009/0129123 A1* | 5/2009 | Taurand | ............ | H02M 3/33576 363/17 |
| 2009/0153106 A1* | 6/2009 | Weigel | ................... | H01F 6/008 322/59 |
| 2010/0232180 A1* | 9/2010 | Sase | ................. | H02M 3/33576 363/17 |
| 2011/0103097 A1* | 5/2011 | Wang | ................ | H02M 3/33592 363/17 |
| 2011/0194206 A1* | 8/2011 | Sase | ................. | H02M 3/33592 360/75 |
| 2012/0014138 A1* | 1/2012 | Ngo | ................. | H02M 3/33584 363/17 |
| 2013/0265804 A1* | 10/2013 | Fu | .................... | H02M 3/33576 363/17 |
| 2015/0229200 A1* | 8/2015 | Schwartz | .......... | H02M 3/33592 363/21.03 |
| 2015/0229225 A1* | 8/2015 | Jang | .................. | H02M 3/33569 363/17 |
| 2015/0263631 A1* | 9/2015 | Matsuura | .......... | H02M 3/33576 363/21.02 |
| 2015/0333634 A1* | 11/2015 | Yoshida | .............. | H02M 3/3353 363/21.03 |
| 2016/0072390 A1* | 3/2016 | Akutagawa | ....... | H02M 3/33507 363/17 |
| 2016/0094136 A1* | 3/2016 | Fu | ...................... | H02M 3/1582 363/21.02 |
| 2016/0126844 A1* | 5/2016 | Tschirhart | ............ | H02M 3/337 363/17 |
| 2016/0294294 A1* | 10/2016 | Ye | ..................... | H02M 3/33592 |
| 2016/0329822 A1* | 11/2016 | Sanchez | ............ | H02M 3/33592 |
| 2017/0294845 A1* | 10/2017 | Kusama | ............. | H02M 7/4807 |
| 2018/0048240 A1* | 2/2018 | Hayasaki | ............ | H02M 3/3376 |

OTHER PUBLICATIONS

Corresponding extended European search report dated Nov. 13, 2019.
Liu Gang et al., "Implementation of a 3.3-kW DC-DC Converter for EV On-Board Charger Employing the Series-Resonant Converter With Reduced-Frequency-Range Control," in IEEE Transactions on Power Electronics, Institute of Electrical and Electronics Engineers, USA, vol. 32, No. 6, pp. 4168-4184, Jun. 2017.
Corresponding European office action dated Oct. 9, 2020.

* cited by examiner

RESONANT CONVERTER AND CONTROL METHOD OF THE RESONANT CONVERTER

CROSS-REFERENCE TO RELATED APPLICATION

This application is a continuation of U.S. patent application Ser. No. 16/286,619, filed on Feb. 27, 2019, which claims priority to Chinese Patent Application No. 201810638360.2, filed on Jun. 20, 2018 and entitled "RESONANT CONVERTER AND CONTROL METHOD". Both of the aforementioned applications are hereby incorporated by reference in their entireties.

TECHNICAL FIELD

The present disclosure relates to the field of power electronic conversion technologies, and in particular, to a resonant converter and a control method.

BACKGROUND

A conventional resonant converter has an advantage of allowing for zero voltage switching (ZVS) of primary side switches, and is widely used in applications where high efficiency, high frequency and high power density are required. However, in applications working in a wide voltage range (wide input voltage or wide output voltage range), there are various problems for the resonant converter, such as a wide switching frequency range, difficulty in design for efficiency optimization, and large-sized magnetic components, which make it difficult for the conventional resonant converter to achieve good performance throughout the entire wide voltage range.

At present, more and more research concentrates on the resonant converter applicable in the wide voltage range. For most of the research work, the basis is to broaden the voltage range of the resonant converter by adding additional circuit. These methods have disadvantages such as high cost and complex topology. On the other hand, without modifying the circuit topology, the US patent document U.S. Pat. No. 9,490,704B2 proposes a control strategy with "variable frequency and delay time", which can narrow the switching frequency range, and thus can be applied to applications in a wide voltage range.

However, since the operating frequency of a traditional resonant converter is higher in light-load condition, the turn-off loss is relatively high, which plays a dominant role in switching loss; while according to the control method proposed in the patent document U.S. Pat. No. 9,490,704B2, the primary side current is smaller than traditional resonant converter in light-load condition, it is harder to achieve ZVS of primary side switches, thus the turn-on loss increases and its light load efficiency is poorer.

SUMMARY

The present disclosure provides a resonant converter and a control method concerning a technical problem about how to reduce the switching frequency in light-load condition, while allowing for ZVS of primary side switches.

In a first aspect, the present disclosure provides a resonant converter adapted to provide an output voltage to a load, where the resonant converter includes:

a primary side circuit including at least one set of primary side switches, where the primary side circuit is configured to receive an input voltage;

a resonant network coupled to the primary side circuit;

a transformer having a primary side winding and a secondary side winding, where the primary side winding is coupled to the resonant network;

a secondary side circuit including at least one set of secondary side switches, where the secondary side circuit is coupled to the secondary side winding of the transformer; and a control block that controls the secondary side switches according to the input voltage and the output voltage, so that the secondary side winding of the transformer is short-circuited during a preset time interval before operating state of the primary side switches changes.

In a second aspect, the present disclosure further provides a control method of a resonant converter, where the resonant converter includes a primary side circuit, a resonant network, a transformer, and a secondary side circuit; the resonant network is electrically coupled to the primary side circuit and a primary side winding of the transformer, and the secondary side circuit is electrically coupled to a secondary side winding of the transformer; the primary side circuit including at least one set of primary side switches, the secondary side circuit including at least one set of secondary side switches; where the control method includes:

detecting an input voltage received by the primary side circuit;

detecting an output voltage generated by the secondary side circuit;

controlling the secondary side switches according to the input voltage and the output voltage, so that the secondary side winding of the transformer is electrically short-circuited; and switching the primary side switches to change operating mode after a preset time interval is passed.

The present disclosure provides a resonant converter, of which a control block controls the secondary side switches according to the input voltage, the output voltage and the current detection signal, so that the secondary side winding of the transformer is short-circuited during a preset time interval before operating state of the primary side switches changes. In this way, the voltage applied to the resonant network is higher, thus the energy stored in the resonant network is larger, which will increase the primary current to ensure ZVS of primary side switches in light-load condition. Meanwhile, the switching frequency is reduced, and the light-load efficiency may be significantly improved.

BRIEF DESCRIPTION OF DRAWINGS

In order to describe technical solutions in embodiments of the present disclosure or the prior art more clearly, accompanying drawings used in the description of embodiments of the present disclosure or the prior art will be briefly described hereunder. Obviously, the described drawings are merely some embodiments of present disclosure. For persons skilled in the art, other drawings may be obtained based on these drawings without any creative work.

DESCRIPTION OF EMBODIMENTS

In order to make objectives, technical solutions, and advantages of embodiments of the present disclosure clearer, the technical solutions in the embodiments of the present disclosure will be described hereunder clearly and completely with reference to the accompanying drawings in the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

Figure 1:
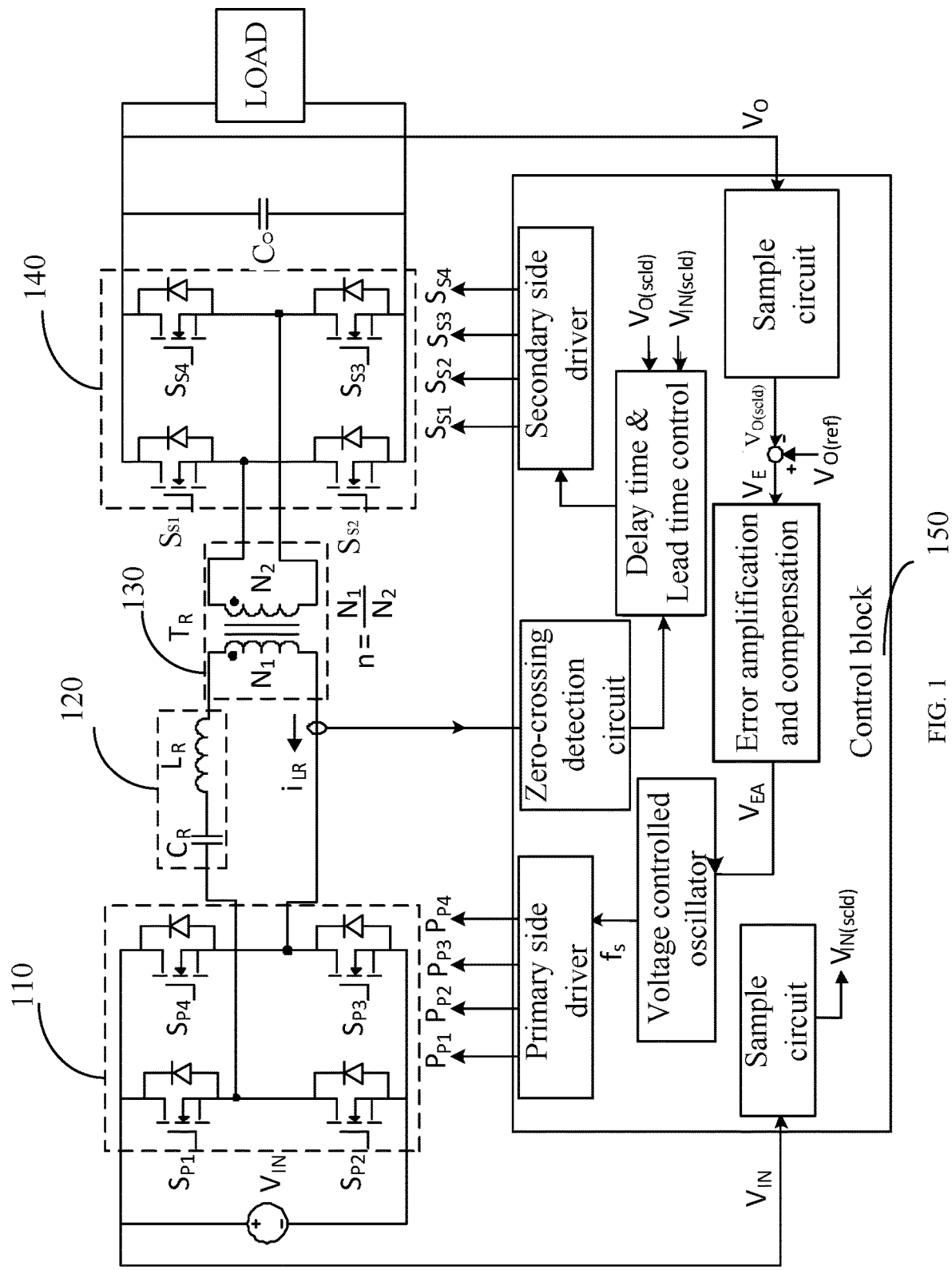
FIG. 1 is a circuit diagram of a resonant converter according to an embodiment of the present disclosure.

FIG. 1 is a circuit diagram of a resonant converter according to an embodiment of the present disclosure. As shown in FIG. 1, the resonant converter provided in this embodiment is adapted to provide an output voltage to a load, where the resonant converter includes: a primary side circuit 110, a resonant network 120, a transformer 130, a secondary side circuit 140, and a control block 150.

Specifically, the primary side circuit 110 described above includes at least one set of primary side switches, where the primary side circuit 110 is configured to receive an input voltage $V_{IN}$.

The primary side circuit 110 may be a full bridge circuit or a half bridge circuit. It should be noted that, in this embodiment, the primary side circuit is not specifically limited in terms of its form, as long as the DC input voltage can be converted into a square wave voltage by the primary side circuit. For a practical application of the resonant converter provided in this embodiment, the form of the primary side circuit may be selected according to actual working conditions and design requirements, but is included in the protected scope of this embodiment.

For the resonant network 120, it is coupled to the primary side circuit 110 described above. The resonant network 120 includes at least one resonant capacitor $C_R$ and at least one resonant inductor $L_R$. For the resonant network 120 including the capacitor, the inductor and a resistor element, it may present capacitive, inductive, or resistive characteristics when working at different frequency. When resonance happens resonates, the current and voltage of the resonant network 120 periodically cross zero point, so that a switch device can be turned on or turned off under zero voltage or zero current conditions, thereby realizing soft switching and reducing switching loss. The resonant network 120 may be a series resonant network or a parallel resonant network. It should be noted that, in this embodiment, the resonant network is not specifically limited in terms of its form.

In addition, the transformer 130 described above has a primary side winding $N_1$ and a secondary side winding $N_2$, where the primary side winding $N_1$ of the transformer 130 is coupled to the resonant network 120 described above, and the secondary side winding $N_2$ of the transformer 130 is coupled to the secondary side circuit 140. The secondary side circuit includes at least one set of secondary side switches.

The control block 150 may control the secondary side switches according to the input voltage and the output voltage, so that the secondary side winding of the transformer is short-circuited during a preset time interval before operating state of the primary side switches changes. Further, the control block 150 may also control the secondary side switches according to a current detection signal, so that the secondary side winding of the transformer is short-circuited during a preset time interval before operating state of the primary side switches changes. The current detection signal represents a current flowing through the primary side winding of the transformer 130. Further, the corresponding preset time interval may be adjusted according to the load current. In addition, the corresponding preset time interval may also be adjusted according to the input voltage, or the like, which, notably, is not specifically limited by the present disclosure.

In an illustrative embodiment, the secondary side circuit described above may be a full bridge rectifying circuit. Specifically, the full bridge rectifying circuit includes:

a first bridge arm including a first switch $S_{S1}$ and a second switch $S_{S2}$ connected in series, where a connecting node between the first switch $S_{S1}$ and the second switch $S_{S2}$ is electrically coupled to one end of the secondary side winding $N_2$;

a second bridge arm connected in parallel with the first bridge arm, where the second bridge arm includes a third switch $S_{S3}$ and a fourth switch $S_{S4}$ connected in series, and a connecting node between the third switch $S_{S3}$ and the fourth switch $S_{S4}$ is electrically coupled to the other end of the secondary side winding $N_2$.

During a first time period, that is, the first half switching period, the control block 150 controls the first switch $S_{S1}$ and the fourth switch $S_{S4}$, so that the secondary side winding $N_2$ is short-circuited during the preset time interval (i.e. Lead Time) before operating state of the primary side switches changes;

During a second time period, that is, the second half switching period, the control block 150 controls the second switch $S_{S2}$ and the third switch $S_{S3}$, so that the secondary side winding $N_2$ is short-circuited during the preset time interval (Lead Time) before operating state of the primary side switches changes.

In this embodiment, the control block controls the secondary side switches according to the input voltage, the output voltage and the current detection signal, so that the secondary side winding of the transformer 130 is short-circuited during a preset time interval before operating state of the primary side switches changes. In this way, the voltage applied to the resonant network 120 is higher, thus the energy stored in the resonant network 120 is larger, which will increase the primary current to ensure ZVS of primary side switches in light-load condition. Meanwhile, the switching frequency is reduced, and the light-load efficiency may be significantly improved. It is to be understood that the light-load condition herein may refer to a condition in which the resonant converter has a load ratio of no more than 30% (e.g., 20%, 10% or 5%).

Figure 2:
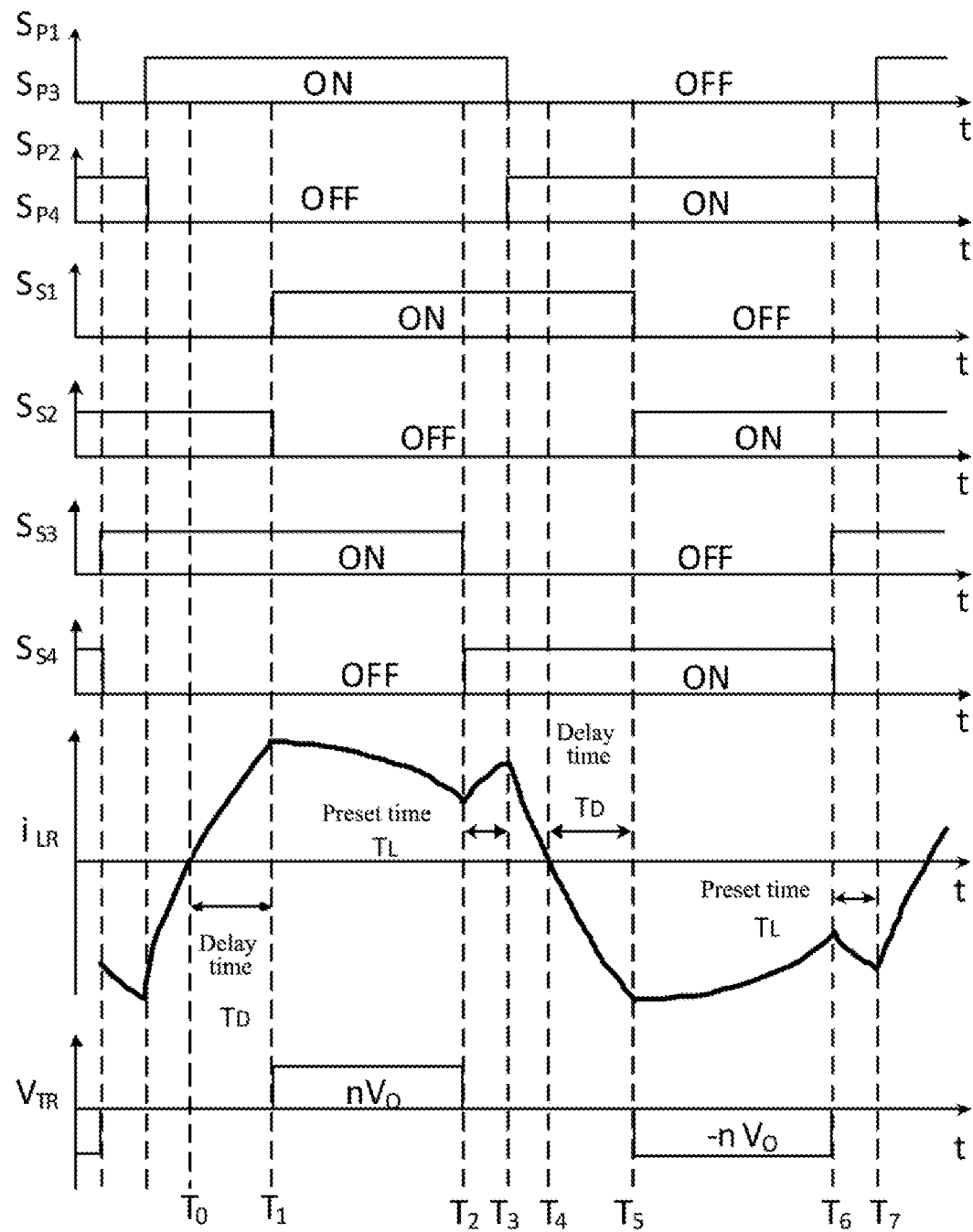
FIG. 2 is a signal timing diagram of the resonant converter as shown in FIG. 1.
Figure 3A:
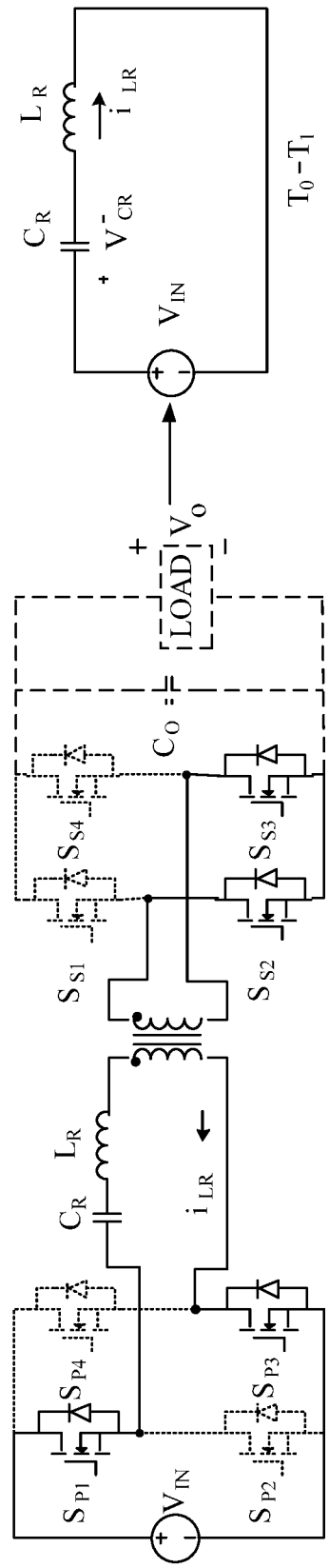
FIG. 3a is a circuit diagram of the resonant converter as shown in FIG. 1 in an operating mode corresponding to a time period $[T_0\text{-}T_1]$.

The operating mode of the resonant converter as shown in FIG. 1 will be specifically described hereunder in conjunction with a specific signal timing diagram of the resonant converter as shown in FIG. 2; furthermore, FIG. 3a is a circuit diagram of the resonant converter as shown in FIG.

Figure 3B:
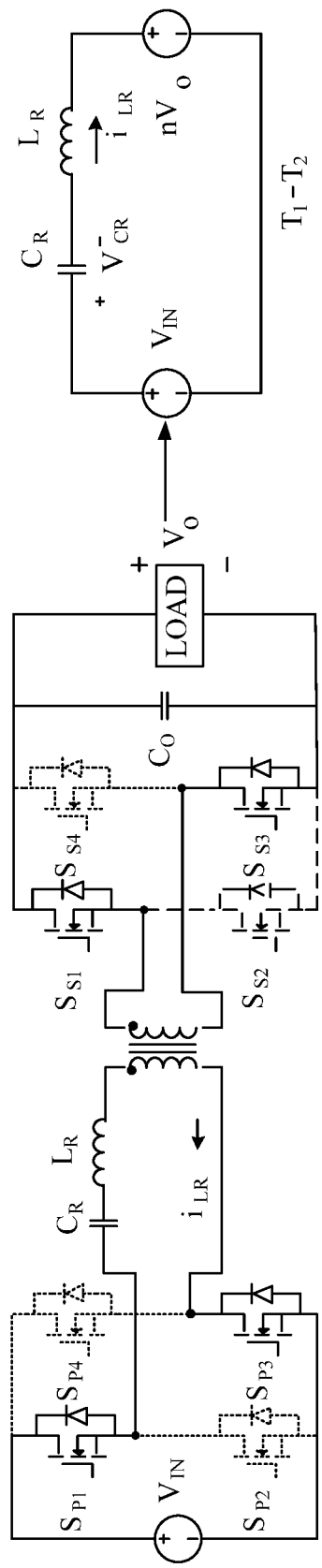
FIG. 3b is a circuit diagram of the resonant converter as shown in FIG. 1 in an operating mode corresponding to a time period $[T_1\text{-}T_2]$.
Figure 3C:
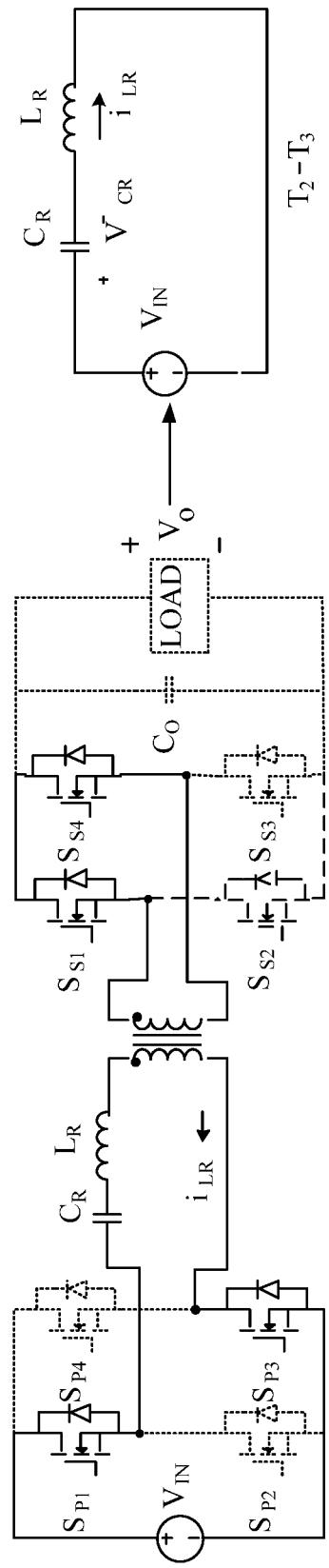
FIG. 3c is a circuit diagram of the resonant converter as shown in FIG. 1 in an operating mode corresponding to a time period [$T_2$-$T_3$]
Figure 3D:
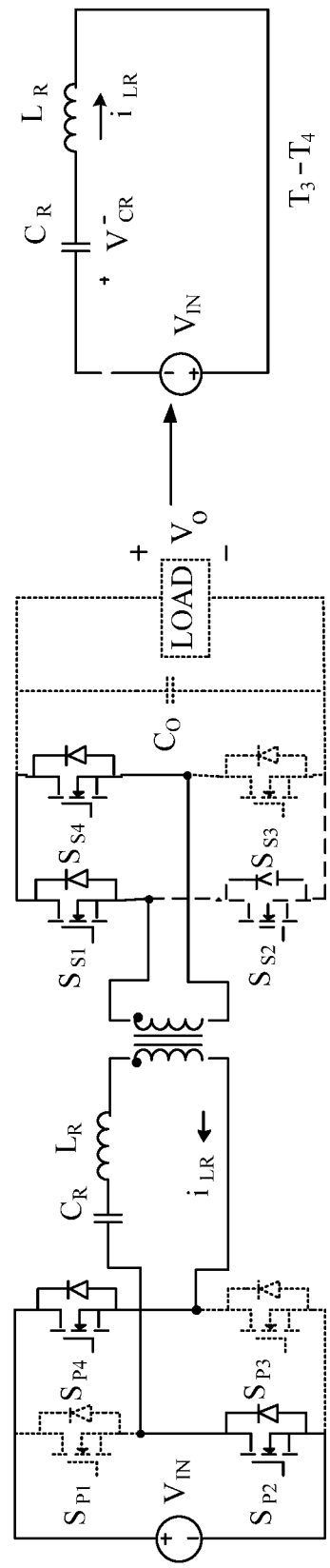
FIG. 3d is circuit diagram of the resonant converter as shown in FIG. 1 in an operating mode corresponding to a time period [$T_3$-$T_4$]

1 in an operating mode corresponding to a time period $[T_0\text{-}T_1]$; FIG. 3b is a circuit diagram of the resonant converter as shown in FIG. 1 in an operating mode corresponding to a time period $[T_1\text{-}T_2]$; FIG. 3c is a circuit diagram of the resonant converter as shown in FIG. 1 in an operating mode corresponding to a time period $[T_2\text{-}T_3]$; and FIG. 3d is a circuit diagram of the resonant converter as shown in FIG. 1 in an operating mode corresponding to a time period $[T_3\text{-}T_4]$.

Reference may be made to FIG. 2 and FIG. 3a, during the time period $[T_0\text{-}T_1]$, the second switch $S_{S2}$ and the third switch $S_{S3}$ in the secondary side circuit are simultaneously turned on, so that the transformer 130 is short-circuited, the input voltage $V_{IN}$ is then directly applied to the resonant network 120, when no energy is transferred from the resonant network 120 to the secondary side circuit.

Reference may be made to FIG. 2 and FIG. 3b, during the time period $[T_1\text{-}T_2]$, the first switch $S_{S1}$ and the third switch $S_{S3}$ in the switches are simultaneously turned on, the voltage difference $V_{IN}\text{-}nV_O$ is applied to the resonant network 120, when the energy is transferred from the resonant network to the secondary side circuit and output, as shown in FIG. 3b. It can be seen that the operating mode is consistent with the conventional operating mode of the resonant converter.

Reference may be made to FIG. 2 and FIG. 3c, the time period $[T_2\text{-}T_3]$ before operating state of the primary side switches $S_{P1}$, $S_{P2}$, $S_{P3}$ and $S_{P4}$ are switched is the preset time interval $T_L$. At the time $T_2$, switching states of the secondary side switches $S_{S3}$ and $S_{S4}$ are changed so that the first switch $S_{S1}$ and the fourth switch $S_{S4}$ in the switches are simultaneously turned on to make the secondary side winding of the transformer 130 short-circuited, the input voltage $V_{IN}$ is then directly applied to the resonant inductor $L_R$ and the resonant capacitor $C_R$, where the current flowing through the primary side circuit 110 increases and contributes to realizing ZVS for the primary side switches. During time period $[T_2\text{-}T_3]$, the circuit diagram of the resonant converter provided in this embodiment is shown in FIG. 3c.

Reference may be made to FIG. 2 and FIG. 3d, at the time $T_3$, switching states of the primary side switches $S_{P1}$, $S_{P2}$, $S_{P3}$ and $S_{P4}$ are changed, the primary side switches $S_{P1}$ and $S_{P3}$ are turned off, and the primary side switches $S_{P2}$ and $S_{P4}$ are turned on. During the time period $[T_3\text{-}T_4]$, the first switch $S_{S1}$ and the fourth switch $S_{S4}$ in the secondary side circuit are simultaneously turned on, the corresponding circuit diagram of the resonant converter provided in this embodiment is shown in FIG. 3d.

It can be seen from the operating states of the above resonant converter that, by adding the time period $[T_2\text{-}T_3]$, a primary side current may be increased to obtain enough negative current required for ZVS of primary side switches in light-load condition. At the same time, by adding the time period $[T_2\text{-}T_3]$, the entire switching period gets longer and the switching frequency reduces, thus further reducing the turn-off loss of the primary side switches. Therefore, by using the resonant converter provided in this embodiment, the efficiency of the resonant converter in light-load condition can be effectively improved.

Similarly, during the second time period, the time period $[T_6\text{-}T_7]$ before when operating state of the primary side switches $S_{P1}$, $S_{P2}$, $S_{P3}$ and $S_{P4}$ are switched is the preset time interval $T_L$, during which the second switch $S_{S2}$ and the third switch $S_{S3}$ in the secondary side circuit are simultaneously turned on, and the transformer 130 is short-circuited. The input voltage $V_{IN}$ is directly applied to the resonant inductor $L_R$ and the resonant capacitor $C_R$. Meanwhile, the current flowing through the primary side circuit 110 increases and contributes to realizing ZVS for the primary side switches.

In order to further illustrate the efficiency improvement in light-load condition when the resonant converter provided in this embodiment is operating with different input voltage, descriptions are made in conjunction with experimental data of the resonant converter provided in this embodiment and the resonant converter in prior art operating in different conditions. When both converters are in light-load condition, with an input voltage of 240V applied to the resonant converter provided in this embodiment and the resonant converter in the prior art respectively, the resonant converter provided in this embodiment has a conversion efficiency of 95%, while the resonant converter in the prior art has a conversion efficiency of only 88%; with an input voltage of 300V applied to the resonant converter provided in this embodiment and the resonant converter in the prior art respectively, the resonant converter provided in this embodiment has a conversion efficiency of 96.3%, while the resonant converter in the prior art has a conversion efficiency of only 88%; with an input voltage of 360V applied to the resonant converter provided in this embodiment and the resonant converter in the prior art respectively, the resonant converter provided in this embodiment has a conversion efficiency of 96.4%, while the resonant converter in the prior art has a conversion efficiency of only 89%. It can be seen that, for different input voltages, the conversion efficiency of the resonant converter provided in this embodiment is significantly higher than that of the resonant converter in the prior art in light-load condition. The respective conversion efficiencies of the resonant converter provided in this embodiment and the resonant converter in the prior art are as follows:

| Input voltage | Conversion efficiency of the resonant converter in the prior art | Conversion efficiency of the resonant converter provided in this embodiment |
| --- | --- | --- |
| 240 V | 88% | 95% |
| 300 V | 88% | 96.3% |
| 360 V | 89% | 96.4% |

In some embodiments, a filter capacitor $C_o$ may be coupled to the secondary side circuit 140 to filter the output voltage, so that the output voltage of the secondary side circuit 140 is substantially stable.

In addition, the control block 150 in the foregoing embodiments may be constructed with an analog circuit or a digital processor. It should be noted that, in this embodiment, the control block is not specifically limited in terms of its form, only if effective control can be achieved for the primary side switches and the secondary side switches. Reference may be made to FIG. 1 again, in a possible implementation, the control block 150 described above may include: a primary side driver and a secondary side driver, where the primary side driver controls the primary side switches $S_{P1}$-$S_{P4}$ according to the output voltage, and the secondary side driver controls the secondary side switches $S_{S1}$-$S_{S4}$ according to the input voltage, the output voltage, and the current detection signal. The control block 150 samples the input voltage and the output voltage to obtain an input voltage sample value $V_{in(scld)}$ and an output voltage sample value $V_{o(scld)}$, respectively. The output voltage sample value $V_{o(scld)}$ is compared with a voltage reference value $V_{o(ref)}$ to obtain a difference value $V_E$, which is then calculated by error amplification and compensation circuit to obtain an output value $V_{EA}$. The output value $V_{EA}$ is then sent to a voltage controlled oscillator, and primary side driving signals, i.e. a switching frequency $f_s$, are then generated. On the other hand, a delay time and lead time control circuit in the control block 150 determines a delay time according to a ratio between the input voltage sample value and the output voltage sample value, where the delay time starts from a zero-crossing point of a resonant current $i_{LR}$ (obtained by a zero-crossing detection circuit); further, the delay time and lead time control circuit determines the preset time interval(that is, the lead time) according to the load current and the switching frequency $f_s$ obtained with a closed-loop control described above, thus may generate the secondary side driving signals.

Figure 4:
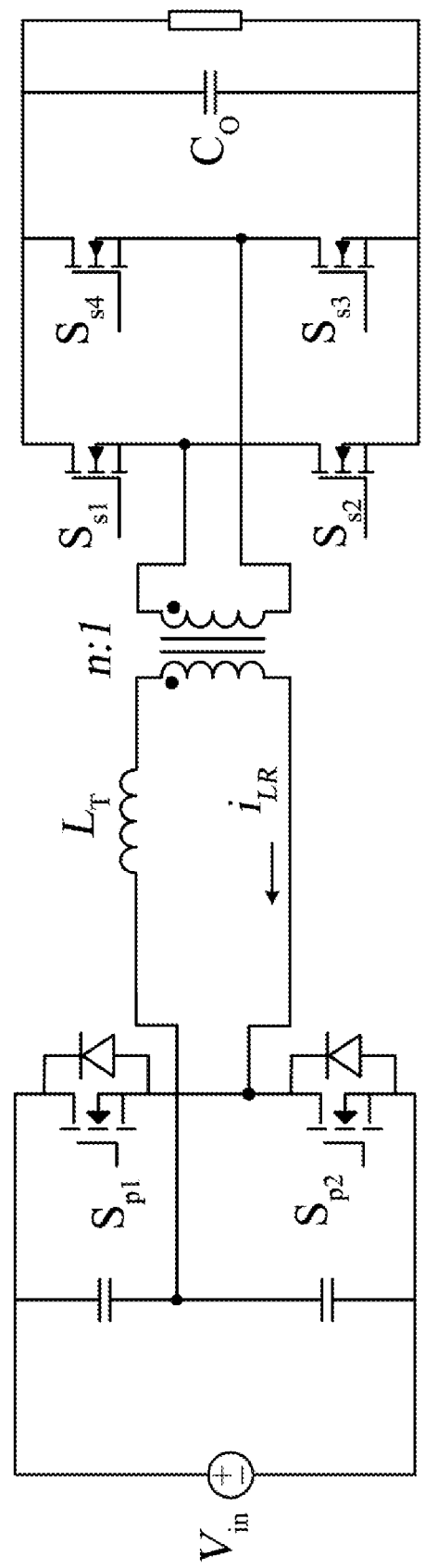
FIG. 4 is a circuit diagram of a resonant converter according to another embodiment of the present disclosure.
Figure 5:
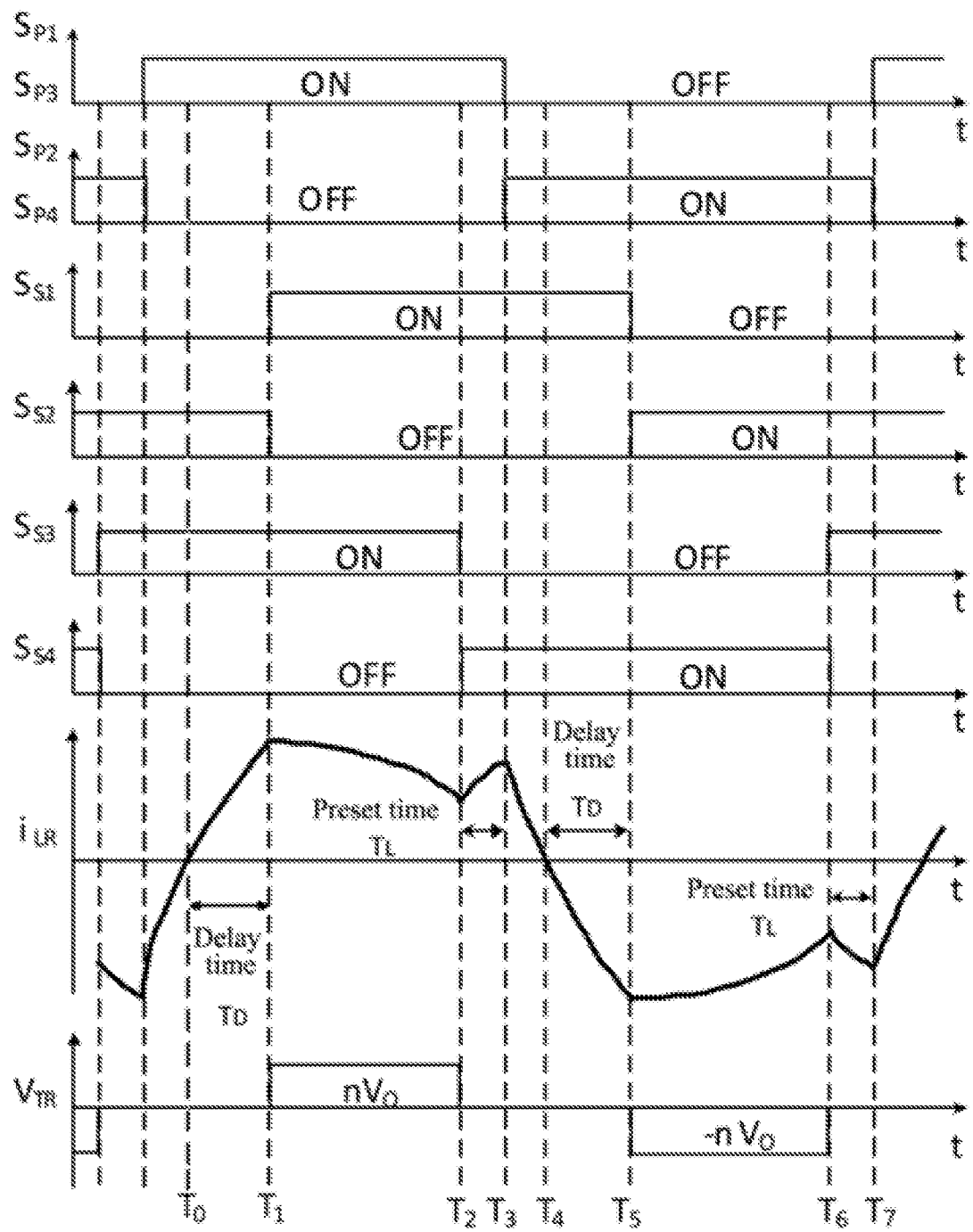
FIG. 5 is a signal timing diagram of the resonant converter as shown in FIG. 4.

FIG. 4 is a circuit diagram of a resonant converter according to another embodiment of the present disclosure; and FIG. 5 is a signal timing diagram of the resonant converter as shown in FIG. 4. As shown in FIG. 4, with reference to FIG. 1, a resonant converter provided in this embodiment is adapted to provide an output voltage to a load, where the resonant converter includes: a primary side circuit, a resonant network, a transformer, a secondary side circuit, and a control block.

In a possible implementation, the primary side circuit described above may be a half bridge circuit. For the resonant network, it is coupled to the primary side circuit described above, and the resonant network includes at least one resonant inductor and at least one resonant capacitor, where a capacitor of the half bridge circuit itself may serve as the resonant capacitor. In addition, the transformer described above has a primary side winding $N_1$ and a secondary side winding $N_2$, where the primary side winding $N_1$ of the transformer is coupled to the resonant network described above, and the secondary side winding $N_2$ of the transformer is coupled to the secondary side circuit. The secondary side circuit includes at least one set of secondary side switches. The control block may control the secondary side switches according to the input voltage and the output voltage, so that the secondary side winding of the transformer is short-circuited during a preset time interval before operating state of the primary side switches changes. Further, the control block may also receive a current detection signal, and control the secondary side switches according to the current detection signal, so that the secondary side winding of the transformer is short-circuited during a preset time interval before operating state of the primary side switches changes. The current detection signal represents a current flowing through the primary side winding of the transformer. Moreover, the corresponding preset time interval may be adjusted according to the load current, the input voltage, or the like, and which is not limited in the disclosure.

Descriptions will be made hereunder in detail to operating modes of the resonant converter in conjunction with FIG. 5. During the time period $[T_0-T_1]$, the second switch $S_{S2}$ and the third switch $S_{S3}$ in the secondary side circuit are simultaneously turned on, so that the transformer is short-circuited, the input voltage Vin is then directly applied to the resonant network, when no energy is transferred from the resonant network to the secondary side circuit and output; during the time period $[T_1-T_2]$, the first switch $S_{S1}$ and the third switch $S_{S3}$ in the secondary side circuit are simultaneously turned on, the voltage difference Vin-nVo is applied to the resonant network, when the energy is transferred from the resonant network to the output; at the time $T_2$, switching states of the third switch $S_{S3}$ and the fourth switch $S_{S4}$ are changed. The time period $[T_2-T_3]$ is the preset time interval $T_L$, during which the first switch $S_{S1}$ and the fourth switch $S_{S4}$ in the secondary side circuit are simultaneously turned on to make the secondary side winding of the transformer short-circuited, the input voltage $V_{IN}$ is then directly applied to the resonant network where the current flowing through the primary side circuit increases and contributes to realizing ZVS for the primary side switches; at the time $T_3$, states of the primary side switches $S_{P1}$, $S_{P2}$, $S_{P3}$ and $S_{P4}$ in the primary side circuit are switched. During the time period $[T_3-T_4]$, the first switch $S_{S1}$ and the fourth switch $S_{S4}$ in the secondary side circuit are simultaneously turned on. Similarly, in the second half switch cycle, $[T_6-T_7]$ is the preset time interval $T_L$, and the second switch $S_{S2}$ and the third switch $S_{S3}$ are simultaneously turned on, so that the transformer is short-circuited. The input voltage Vin is directly applied to the resonant network. At this time, the current of the primary side circuit increases, which is advantageous for the primary side switches to realize ZVS.

It can be seen from the operating states of the above resonant converter that, by adding the time period $[T_2-T_3]$ and $[T_6-T_7]$, a primary side current may be increased to obtain enough negative current required for ZVS of primary side switches in light-load condition. At the same time, by adding the time period $[T_2-T_3]$ and $[T_6-T_7]$, the entire switching period gets longer and the switching frequency reduces, thus further reducing the turn-off loss of the primary side switches. Therefore, by using the resonant converter provided in this embodiment, the efficiency of the resonant converter in light-load condition may be effectively improved.

Figure 6:
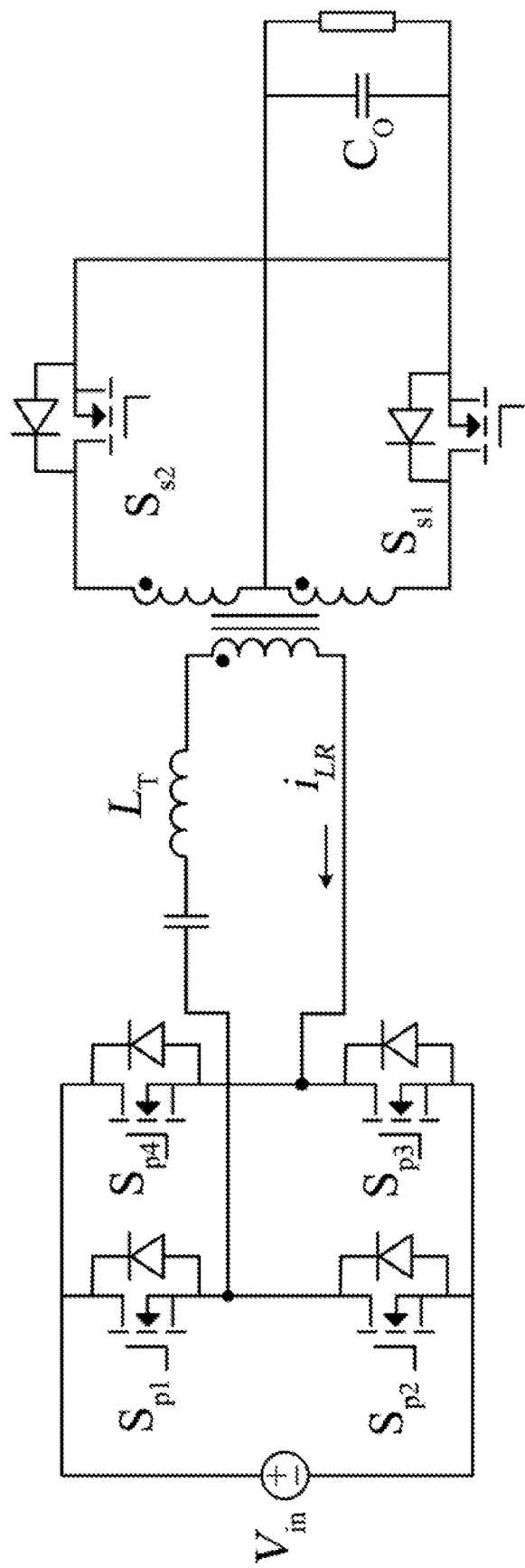
FIG. 6 is a circuit diagram of a resonant converter according to another embodiment of the present disclosure.

FIG. 6 is a circuit diagram of a resonant converter according to another embodiment of the present disclosure. As shown in FIG. 6, with reference to FIG. 1, a resonant converter provided in this embodiment is adapted to provide an output voltage to a load, where the resonant converter includes: a primary side circuit, a resonant network, a transformer, a secondary side circuit, and a control block.

In a possible implementation, the secondary side circuit described above may be a center-tap rectifying circuit that includes: a first switch $S_{S1}$ and a second switch $S_{S2}$ electrically coupled to the secondary side winding respectively.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A resonant converter adapted to provide an output voltage to a load, wherein the resonant converter operates in light-load condition, and wherein the resonant converter comprises:
   a primary side circuit comprising at least one set of primary side switches, wherein the primary side circuit is configured to receive an input voltage; wherein the primary side circuit is a full bridge circuit, and primary side switches at a diagonal of the full bridge circuit drive synchronously;
   a resonant network coupled to the primary side circuit;

a transformer having a primary side winding and a secondary side winding, wherein the primary side winding is coupled to the resonant network;

a secondary side circuit comprising at least one set of secondary side switches, wherein the secondary side circuit is coupled to the secondary side winding of the transformer; and a control block that controls the secondary side switches according to the input voltage and the output voltage, wherein the secondary side winding of the transformer is short-circuited during a preset time interval before operating state of the primary side switches changes, such that a current flowing through the primary side circuit increases to realize soft switching for the primary side switches.

2. The resonant converter according to claim 1, wherein the secondary side circuit is a full-bridge rectifying circuit or a center-tap rectifying circuit.

3. The resonant converter according to claim 2, wherein the secondary side circuit is a full-bridge rectifying circuit that comprises:

a first bridge arm comprising a first switch and a second switch connected in series, wherein a common node between the first switch and the second switch is electrically coupled to one end of the secondary side winding; and a second bridge arm connected in parallel with the first bridge arm, wherein the second bridge arm comprises a third switch and a fourth switch connected in series, and a common node between the third switch and the fourth switch is electrically coupled to the other end of the secondary side winding;

wherein during a first time period, the control block controls, during the preset time interval before operating state of the primary side switches changes, the first switch and the fourth switch to be simultaneously turned on; and during a second time period, the control block controls, during the preset time interval before operating state of the primary side switches changes, the second switch and the third switch to be simultaneously turned on.

4. The resonant converter according to claim 3, wherein the control block further controls, during the preset time interval of the first time period, the second switch and the third switch to be simultaneously turned off; the control block further controls, during the preset time interval of the second time period, the first switch and the fourth switch to be simultaneously turned off.

5. The resonant converter according to claim 1, wherein the resonant converter further comprises a filter capacitor coupled to the secondary side circuit.

6. The resonant converter according to claim 1, wherein the resonant network comprises at least one resonant capacitor and at least one resonant inductor.

7. The resonant converter according to claim 1, wherein the control block is an analog circuit or a digital processor.

8. The resonant converter according to claim 1, wherein the control block further receives a current detection signal, and controls the secondary side switches according to the input voltage, the output voltage and the current detection signal.

9. The resonant converter according to claim 8, wherein the current detection signal reflects a current flowing through the primary side winding.

10. The resonant converter according to claim 1, wherein the preset time interval is adjusted according to a load current or the input voltage.

11. The resonant converter according to claim 1, wherein the control block comprises: a primary side driver and a secondary side driver, wherein the primary side driver controls the primary side switches according to the output voltage and the secondary side driver controls the secondary side switches according to the input voltage and the output voltage.

12. The resonant converter according to claim 1, wherein the light-load condition is a condition in which the resonant converter has a load ratio of no more than 30%.

13. The resonant converter according to claim 12, wherein the at least one set of primary side switches are each turned on at zero voltage.

14. A control method of a resonant converter, wherein the resonant converter operates in light-load condition, and wherein the resonant converter comprises a primary side circuit, a resonant network, a transformer having a primary side winding and a secondary side winding, and a secondary side circuit, the resonant network is electrically coupled to the primary side circuit and the primary side winding of the transformer, and the secondary side circuit is electrically coupled to the secondary side winding of the transformer, the primary side circuit includes at least one set of primary side switches, wherein the primary side circuit is a full bridge circuit, and the primary side switches at a diagonal of the full bridge circuit drive synchronously, and the secondary side circuit includes at least one set of secondary side switches, the method comprising:

detecting an input voltage received by the primary side circuit;

detecting an output voltage generated by the secondary side circuit;

controlling the at least one set of secondary side switches of the secondary side circuit according to the input voltage and the output voltage, wherein the secondary side winding of the transformer is short-circuited during a preset time interval before operating state of the at least one set of primary side switches changes, such that a current flowing through the primary side circuit increases to realize soft switching for the primary side switches.

15. The control method according to claim 14, further comprising:

obtaining a current detection signal; and controlling the secondary side switches according to the input voltage, the output voltage and the current detection signal.

16. The control method according to claim 15, wherein the current detection signal reflects a current flowing through the primary side winding.

17. The control method according to claim 14, wherein the light-load condition is a condition in which the resonant converter has a load ratio of no more than 30%.

18. The control method according to claim 17, wherein the control method controls the at least one set of primary side switches to be each turned on at zero voltage.

19. The control method according to claim 14, wherein the preset time interval is adjusted according to a load current or the input voltage.

20. The control method according to claim 14, wherein the secondary side circuit is a full-bridge rectifying circuit or a center-tap rectifying circuit.

* * * * *